United States Patent Office 3,061,554
Patented Oct. 30, 1962

3,061,554
WATER-DISPERSIBLE EMULSIONS OF
PINANE HYDROPEROXIDE
Richard D. Vartanian, Bound Brook, and Wendell P. Munro, Martinsville, N.J., assignors to American Cyanamid Company, New York, N.Y., a corporation of Maine
No Drawing. Filed June 2, 1958, Ser. No. 739,008
2 Claims. (Cl. 252—426)

This invention relates to aqueous emulsions of organic peroxides and peroxidic compounds as catalysts for polymerization of monomers which are initiated by free radicals. More particularly, the present invention relates to aqueous emulsions of pinane hydroperoxide as a polymerization catalyst for unsaturated polyester compositions in emulsion polymerization systems, and still more specifically, to the use of such compositions in the finishing of textile fabrics.

For some time there has been a need for peroxide catalysts that could be employed conveniently in an aqueous emulsion with polyester resin compositions, and particularly for such a catalyst for use in such a composition for the treatment of textile fabrics to impart flexible stiffness thereto. Available commercial peroxides, as for example, benzoyl peroxide, tertiary butyl peroxide and numerous other peroxides and peroxidic compounds are generally not satisfactory, or at least extremely difficult to work with in that they are not soluble nor readily dispersible in polyester emulsions. Thus, in this particular application, such peroxidic catalyst materials, in addition to being characterized by these deficiencies respecting their dispersibility or solubility in the polyester emulsions, cannot be prepared significantly in advance of their combination with the polyester resin in the preparation of the emulsion composition, in that the emulsions of these catalysts are in themselves characterized by very limited stability.

As noted hereinabove, the peroxidic catalyst emulsions of this invention have particular utility when employed in combination with polyester resins, which resulting compositions are highly suited for imparting flexible stiffness to textile materials, and in particular cellulose-containing formed textile fabrics. The impartation of a flexible durable stiffness to cellulose-containing textile fabrics is particularly troublesome in the textile finishing industry, particularly with respect to the employment of polyester resins as the principal stiffening agent. This problem is even more acute when the cellulosic component of the textile fabric is rayon. In this connection, in prior art finishing treatments it has been extremely difficult, regardless of the finishing agent employed, to impart a high order of flexible stiffness to rayon textile materials.

Accordingly, it is an object of this invention to provide a stable aqueous emulsion of pinane hydroperoxide, which emulsion is suitable as a polymerization catalyst for unsaturated polyester resin compositions in emulsion systems.

It is a further object of this invention to provide a pinane hydroperoxide emulsion, which in addition to being a stable emulsion, is one which may be readily employed in the presence of water, being compatible and instantly miscible in either aqueous systems or in oil-in-water emulsions.

It is a still further object of this invention to provide a stable aqueous emulsion of pinane hydroperoxide, which is readily compatible with polyester resin compositions, and which may be readily combined therewith to provide a stable emulsion composition capable, when applied to textile materials, of imparting a flexible stiffness thereto.

It is a particular and more specific object of this invention to provide a flexible stiffening composition and a process for applying the same to cellulosic textile materials and more particularly, formed fabrics, and still more specifically, rayon formed fabrics whereby a durable stiffness is imparted thereto.

These and other objects and advantages will become more apparent from the detailed description set forth hereinbelow.

In accordance with the present invention, a stable peroxide catalyst emulsion is provided, which is employable in the presence of water, compatible and instantly miscible in an oil-in-water emulsion, which comprises pinane hydroperoxide, a stabilizer or protective colloid therefor, a surface active agent and water.

It is a most important aspect of this invention that the stable oil-in-water pinane hydroperoxide catalyst emulsion is characterized by a major portion of the particles, at least 50% being of a size up to 12 microns in diameter. Preferably, the particles are from between 0.01 and .5 microns in size.

It should be noted that the particle size of the emulsion is achieved through the function of the stabilizers or protective colloids and surface active agents coupled with the action of high speed agitation or other means of obtaining thorough agitation or mixing whereby a product of smooth consistency and appearance is obtained.

As will be seen more clearly hereafter, pinane hydroperoxide, as a catalyst for polymerization for monomers which are initiated by free radicals, is unique and outstanding with respect to the stability of emulsions formed therewith, and also within more specific limits, is the use of such a catalyst emulsion composition with polyester resins in the impartation of flexible stiffness to cellulosic-containing textile materials.

In the stable emulsion of the present invention, the content of the pinane hydroperoxide catalyst component may vary over substantial limits. Thus, in content, the stable emulsion may contain from between 5 and 75% of the pinane hydroperoxide, but more normally and principally, from commercial considerations, i.e., the most economical commercial content is from between 30 and 60%.

The pinane hydroperoxide catalytic component is stabilized by known stabilizing agents and particularly those classifiable as hydrophilic stabilizers. As examples of such materials, the following are illustrative: polyvinyl alcohol, gelatin, methyl cellulose, carboxymethyl cellulose, hydroxyethyl cellulose, polyacrylamide, and in some instances, casein. The stabilizer functions as a protective colloid, and may be employed in amounts of from between 0.5 and 25%, and preferably from between 2 and 10%, based on the weight of the hydroperoxide catalyst component.

It is essential to the preparation of the stable aqueous emulsion of the catalytic hydroperoxide that a surface active agent or emulsifier be employed in the composition. The emulsifier may be non-ionic, anionic or cationic, so long at it is compatible with the other or remaining essential components of the emulsion and preferably when the emulsion is employed in a pad bath with polyester resins, must be compatible with these materials. Many different emulsifiers may be employed, and as examples, especially of non-ionic surface active agents, that identified as Deceresol NI, which is a reaction product of nonylphenol plus 9.5 moles of ethylene oxide, Triton X-100 (alkaryl polyether alcohol), and the Pluronics (polyoxypropylene polyoxyethylene condensates). As examples of suitable cationic agents: Aerosol C-61 (ethanolated alkyl guanidine amine complex), Triton K-60 (stearyl dimethyl benzyl ammonium chloride), and the Armacs (acetic acid salts of long chain N-alkylamines) are illustrative. Among the anionic agents that may be employed, the following are illustrative: Duponol ME (a long-chain alcohol sulfate), Aerosol OT (dioctyl ester of sodium sulfosuccinic acid), and fatty acid soaps. Combinations employing anionic and cationic agents are also contemplated. The emulsifier is employed in the amount required to produce a good emulsion, and normally is employed in an amount between 0.5 and 10%, based on the amount of the hydroperoxide catalyst employed.

Aqueous pinane hydroperoxide catalyst emulsions containing the above three identified essential components are characterized by significant and substantial improved stability with respect to other known peroxidic catalyst emulsions.

By a "stable catalytic emulsion" as that term is employed herein, and as it is identified with respect to catalytic emulsions of this invention, refers to emulsions characterized by a freedom from creaming or separation or formation of flock for at least six months at 25° C. The superiority of the stability of the compositions of this invention with respect to like emulsions of other known peroxidic catalytic materials will be illustrated more clearly hereinafter.

The polyester resins contemplated for use in combination with the pinane hydroperoxide catalyst emulsion of this invention are those resins prepared or formed by condensing a polyhydric alcohol with a polybasic acid. Sometimes these resins are known or described as the alkyd resins. When considered as a species of alkyd resins, as the term is generally understood and accepted in the art, the resins contemplated for use in the present invention may generally be described as oil-free alkyds, those normally composed of the reaction products of a polyhydric alcohol and a polybasic acid, sometimes in combination with cross-linking or other modifying agents. While oil-modified alkyds are contemplated for use in accordance with this invention, the fact that they discolor white goods renders them less attractive for general application work.

The polycarboxylic acids sometimes described as being free of non-benzenoid unsaturation or its anhydrides, may be one of more of a number of such known acids as, for example, phthalic, oxalic, malonic, succinic, glutaric, sebacic, adipic, pimelic, subaric, azelaic, tricarballylic, citric, tartaric, maleic, and the like. As indicated above, wherever available, the anhydrides may be employed. Furthermore, mixtures of these acids and/or their anhydrides may be employed.

Among the polyhydric alcohols which may be used are ethylene glycol, diethylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, alkane diols, propylene glycol, dipropylene glycol, and the like. These polyhydric alcohols will be employed alone or in admixture, one with the other.

As noted hereinabove, when these polyesters are employed for use on textile materials in accordance with this invention for the purpose of imparting a flexible stiffness thereto, they are normally employed in combination with a cross-linking agent such as diallyl phthalate, diallyl maleate, diallyl propionate, or other of a large number of known and available allyl esters or a plasticizer such as acrylamide, lower alkyl substituted acrylamides, such as methylenebisacrylamide, or in some instances, these polyester resins are employed with a cross-linking agent and a plasticizer.

Normally, in the preparation of the stable aqueous emulsions of pinane hydroperoxide in accordance with this invention, a pinane hydroperoxide solution is added slowly with high speed stirring to an aqueous solution of a stabilizer and an emulsifier in accordance with the definition of these terms set forth hereinabove. High speed stirring is thereafter continued until a smooth oil-in-water emulsion is formed. Details illustrating the mechanical preparation of these emulsions will appear more clearly hereinafter in the illustrative examples.

In accordance with the present invention, the pinane hydroperoxide emulsion-polyester resin emulsion composition may be applied to textile materials in any of a number of suitable and well-known application techniques. Thus, for example, this composition may be applied as by spraying, padding, immersion or other suitable means. Normally, and because it is the most widely accepted commercial method for the application of finishes to textile materials, the padding technique is most desirable and therefore the illustrative examples, which are to follow, as well as the instant description, will relate to the employment of such a technique.

Thus, in accordance with this invention, a pad bath is prepared, employing the necessary amounts of the separate emulsions, i.e., the pinane hydroperoxide emulsion and the polyester resin emulsion, in amounts sufficient to give the desired concentration in the pad bath, which amounts can be determined by adjusting the pickup from the pad bath to the proper amount to provide the desired degree of stiffening on the finished fabric.

Normally, in accordance with the present invention, the polyester resin component is applied to the textile material in an amount sufficient to provide from about 1 and 100%, based on the dry weight of the textile material, and preferably an amount of between 10 and 50%, based on said textile material weight.

The amount of pinane hydroperoxide catalyst employed should be an amount capable of providing an effective cure for the polyester resin, and normally is an amount of from between 0.5 and 10%, and preferably from between 1 and 5%, based on the weight of the resin solids.

After the application of the polyester resin to the textile material, the material so treated is dried and cured to provide a finished textile material characterized by a flexible stiffness. Normally, drying would be carried out at temperatures of from between about 200 and 300° F., until the fabric is dried and thereafter cured over a somewhat higher temperature range, as for example, between 300 and 450° F., for from about 2 minutes to about 30 seconds, respectively. Times and temperatures for effecting the cure of the polyester resin are for the most part inversely proportional. Thus, longer periods of time are required for lower temperature cures, and shorter periods of time for higher temperature cures. Within relatively broad limits, conditions for effecting the drying and curing of the resin finished cloth may be readily determined by one skilled in the art.

In order that the present invention may be more readily understood, the following examples are given, primarily by way of illustration. No details appearing therein should be construed as limiting the present invention, except as they appear in the appended claim. All parts and percentages are by weight unless otherwise specifically designated.

EXAMPLE 1

20 parts of technical pinane hydroperoxide (80% active) were slowly added with high speed stirring or agitation to a solution of 2 parts of a 20% solution of polyvinyl alcohol (Elvanol 51–05) and 4 parts of a 10% solution of polyvinyl alcohol (Elvanol 52–22) and 0.2 part of a non-ionic emulsifier identified as Ethomid HT-25, a hydrogenated tallow amide having an alkyl chain mixture containing 25% palmitic, 70% stearic and 5% oleic groups, condensed with 15 moles of ethylene oxide. In addition, the stabilizer-emulsifier composition contained 13.8 parts of water. The high speed stirring was continued until a uniform oil-in-water emulsion having a viscosity of 15 poises at 25° C. and a particle size of from 1 to 3 microns was obtained. The emulsion was stable for at least six months of storage at 25° C.

It will be noted in the above composition that two different species of polyvinyl alcohol were employed as stabilizers. These species of alcohols differ each from the other with respect to their viscosity and their degree of hydrolysis. It has been indicated that the employment of mixtures of these species of polyvinyl alcohols results in a more effective stabilizing action than produced by either one alone.

EXAMPLE 2

The same general procedure as was employed in Example 1 was employed herein, except that the high speed stirring was continued until the particle size in the emulsion was substantially completely of the order of one micron, and the viscosity was 20 poises at 25° C. This emulsion was characterized by excellent stability and showed but a small amount of creaming or separation after eight months at 25° C.

EXAMPLE 3

The same general procedure as that employed in Example 1 was employed in the preparation of the emulsions of the following peroxidic catalyst material. Where it was not indicated, either because of the physical conditions of the peroxidic compound or for other reasons, that a procedure substantially identical with that employed in Example 1 could be employed, a similar and closely related procedure was followed.

Emulsion No.: Peroxide
1_____ Pinane hydroperoxide.
2_____ 60% methyl ethyl ketone peroxide in dimethyl phthalate.
3_____ 50% di-t-butyl diperphthalate in dibutyl phthalate.
4_____ t-butyl perborate.
5_____ t-butyl peroxide.
6_____ Di-t-butyl peroxide.
7_____ 50% p-chlorobenzoyl peroxide in dibutyl phthalate.
8_____ 50% hydroxyheptyl peroxide in dibutyl phthalate.
9_____ 50% 2,4-dichlorobenzoyl peroxide in dibutyl phthalate.
10_____ 50% benzoyl peroxide in tricresyl phosphate.

These emulsions were then stored at 25° C. and their stability observed. The results of these observations are recorded in Table I hereinbelow

*Table I*

Emulsion No.: Stability
1_____ No change at 8 months.
2_____ Settling after 3 months.
3_____ Separation after 1 month.
4_____ Slight separation after 2 months.
5_____ Separation after 1 month.
6_____ Separation after 1 month.
7_____ Separation after 1 month.
8_____ Separation after 2 months, gas evolved.
9_____ Settling after 2 months.
10_____ Separation after 1 month.

In order to illustrate the compatibility and ready miscibility of the pinane hydroperoxide emulsions of this invention with polyester emulsions, and the utilitarin advantage of this concept in imparting durable flexible stiffness to textile materials containing cellulose, the following emulsion compositions were prepared.

EMULSION COMPOSITIONS

No. 1:
    40% polyester resin A [1]
    18% amyl alcohol
    1.0% Elvanol 51-05 (polyvinyl alcohol) Viscosity [2] of 4-6 centipoises (20° C.), percent hydrolysis=88-89

NOTES:
[1] Polyester Resin A is a polyester resin prepared by condensing propylene glycol, phthalic anhydride and maleic anhydride.
[2] Viscosity of a 4% water solution at 20° C.

1.0% Elvanol 52-22 (polyvinyl alcohol) Viscosity of 21-25 centipoises (20° C.) percent hydrolysis=87-89
    0.5% Ethomid HT-25—A hydrogenated tallow amide which has an alkyl chain mixture containing 25% palmitic, 70% stearic and 5% oleic groups, condensed with 15 moles of ethylene oxide
    39.5% water No. 2:
    25% resin B [3]
    35% benzene
    1% Elvanol 51-05
    1% Elvanol 52-22
    0.5% Ethomid HT-25—A hydrogenated tallow amide which has an alkyl chain mixture containing 25% palmitic, 70% stearic and 5% oleic groups, condensed with 15 moles of ethylene oxide
    37.5% water NOTES:
[3] Resin B is a telomer of diallyl phthalate.

No. 3:
    50% Pinane hydroperoxide
    1% Elvanol 51-05
    1% Elvanol 52-22
    0.5% Ethomid HT-25
    47.5% water No. 4:
    30% benzoyl peroxide
    30% tricresyl phosphate
    2% Elvanol 51-05
    1% Elvanol 52-22
    1% Ethomid HT-25
    36% water Employing the above emulsions, six pad baths were prepared, using the necessary amounts of the separate emulsions to give a concentration in the pad bath which would provide the desired amount of both resins on the fabric at the pick-up specified hereinbelow. The catalyst emulsions, namely, Emulsions 3 and 4, were employed in the pad bath in sufficient amounts to give 2.5% active material on the total resin solids in the bath. The composition of the six pad baths is set forth in Table II hereinbelow.

*Table II*

| Pad Bath | Emulsion No. 1, g. | Emulsion No. 2, g. | Emulsion No. 3, g. | Emulsion No. 4, g. | Water to Total of g. |
|---|---|---|---|---|---|
| 1 | 53.0 | 56.6 | 1.76 | | 200 |
| 2 | 35.3 | 37.7 | 1.18 | | 200 |
| 3 | 17.7 | 18.9 | 0.6 | | 200 |
| 4 | 8.9 | 9.5 | 0.3 | | 200 |
| 5 | 53.0 | 56.6 | | 2.93 | 200 |
| 6 | 53.0 | 56.6 | | 2.93 | 200 |

The above pad bath compositions were padded on swatches of both 80 x 80 cotton percale and rayon challis, and were impregnated with each bath using a Microset Padder. Approximately 80% pick-up was realized on cotton and 95% on the rayon challis fabric. The swatches were then dried for 2 minutes at 225° F. and cured for 1.5 minutes at 350° F.

The thus treated fabrics were then evaluated for stiffness, both initially and after washing, as well as tensile strength, initially and after washing, and the results of this testing are set forth in Table III hereinbelow.

After curing, ½ of each of the treated samples was washed in a laundromat washer as follows:

Rayon challis—0.1% soap at 100° F.
80 x 80 cotton percale—0.1% soap and 0.1% soda ash at 160° F.

The so-washed fabrics were then rinsed in water at corresponding temperatures, centrifuged and pressed dry on a flat ironer. After hand evaluations were made, the fabrics were then washed for an additional 45 minutes in the manner described.

The stiffness measurements recorded in Table III were measured on a Gurley RD Stiffness tester, and the tensile strength was measured on a Scott tester according to ASTM standards.

*Table III*

COTTON PERCALE

| Pad Bath | Percent Resins on Fabric | Gurley Stiffness | | Tensile Strength | |
|---|---|---|---|---|---|
| | | Initial | Wash | Initial | Wash |
| 1 | 15 | 305.8 | 89.9 | 117 | 109 |
| 2 | 10 | 157.6 | 54.4 | 94 | 98 |
| 3 | 5 | 72.1 | 29.5 | 102 | 91 |
| 4 | 2.5 | 34.5 | 22.2 | 93 | 99 |
| 5 | 15 | 239.1 | 84.4 | 122 | 100 |
| 6 | 15 | 255.8 | 87.7 | 122 | 98 |
| Untreated | | 19.5 | | 93 | |

RAYON CHALLIS

| Pad Bath | Percent Resins on Fabric | Gurley Stiffness | |
|---|---|---|---|
| | | Initial | Wash |
| 1 | 16.8 | 155.7 | 119.9 |
| 2 | 11.2 | 126.5 | 71.0 |
| 3 | 5.6 | 79.9 | 31.7 |
| 4 | 2.8 | 33.4 | 34.4 |
| 5 | 16.8 | 166.8 | 104.3 |
| 6 | 16.8 | 155.4 | 97.7 |
| Untreated | | 12.8 | 14.2 |

As will be seen in Table III hereinabove, the use of pinane hydroperoxide in place of the benzoyl peroxide in pad baths 5 and 6 resulted in substantially improved and superior initial stiffness on the cotton percale and a substantially improved and superior durability of stiffness on the rayon challis.

While this aspect of the present invention has been described primarily in conjunction with formed cellulosic fabrics, it should be noted that the present invention is useful in the finishing of cellulose-containing textile materials, by which term is meant fibers, filaments, yarns and formed fabrics, whether they be woven or non-woven or otherwise formed.

By "cellulose-containing textile materials" as that term is referred to herein, it is meant textile materials including cotton textile material, regenerated cellulose textile materials, such as viscose and the like, either alone or in combination with other textile materials, where the cellulosic portion constitutes at least 50% of such material. Thus, for example, the celluosic textile material may be blended with other material or synthetic fibers, as for example, linen, wool fibers, nylon, polyester fibers, acrylic fibers, and the like.

The viscosity of stable oil-in-water pinane hydroperoxide emulsions prepared in accordance with this invention are not, for the most part, critical, though the emulsion should be characterized by a viscosity which renders it flowable and preferably freely flowable.

It should be further noted that in the application of the flexible stiffness in accordance with the present invention, the pad baths may contain softeners, lubricants, impregnates, including thermosetting and other thermoplastic finishing resins, dicyandiamides and other conventional treating bath components, where they are not incompatible with the essential components of the pad bath composition in accordance with this invention.

We claim:
1. A stable peroxide catalyst oil-in-water emulsion, characterized by at least 50% of the particles being less than 12 microns in diameter, which is compatible and instantly miscible in aqueous systems and oil-in-water emulsions, which comprise pinane hydroperoxide, a stabilizer, and a surface active agent.

2. A stable peroxide catalyst oil-in-water emulsion compatible and instantly miscible in aqueous systems and oil-in-water emulsions and characterized by the particles being from 0.01 to 5 microns in size which comprises pinane hydroperoxide, from .5 to 25% based on the weight of the pinane hydroperoxide of a stabilizer and a surface active agent in an amount sufficient to produce a good emulsion.

References Cited in the file of this patent

UNITED STATES PATENTS

| 2,334,107 | Light et al. | Nov. 9, 1943 |
| 2,418,832 | Hanford et al. | Apr. 15, 1947 |
| 2,454,254 | Kuoch et al. | Nov. 16, 1948 |
| 2,505,347 | Brucksch | Apr. 25, 1950 |
| 2,511,895 | Bacon et al. | June 20, 1950 |
| 2,527,640 | Lorand et al. | Oct. 31, 1950 |
| 2,855,373 | Guenther | Oct. 7, 1958 |

OTHER REFERENCES

Industrial and Engineering Chemistry, Fisher et al., volume 47, "Peroxides From Turpentine," pages 1368–1372, July 1955, No. 7.